United States Patent [19]

Jenkins et al.

[11] Patent Number: 4,873,047

[45] Date of Patent: Oct. 10, 1989

[54] SHAPING ANODIC ALUMINUM OXIDE SHEET

[75] Inventors: Dianne M. Jenkins, Leamington Spa; Christopher Pargeter, Banbury, both of England

[73] Assignee: Alcan International Limited, Montreal, Canada

[21] Appl. No.: 118,724

[22] Filed: Nov. 9, 1987

[30] Foreign Application Priority Data

Nov. 11, 1986 [GB] United Kingdom ............... 8626853

[51] Int. Cl.⁴ .................................... C04B 35/10
[52] U.S. Cl. .................... 264/322; 264/294; 264/295
[58] Field of Search .............. 264/322, 294, 295

[56] References Cited

FOREIGN PATENT DOCUMENTS 0178831 4/1986 European Pat. Off. .
60-72706 4/1985 Japan ................................ 264/322

*Primary Examiner*—James Derrington
*Attorney, Agent, or Firm*—Cooper & Dunham

[57] ABSTRACT

Porous anodic aluminum oxide sheet, when removed from its aluminum metal substrate, is a useful filter but rather brittle. It can be formed into a desired shape by flexing in a direction transverse to the direction in which the metal substrate was rolled. Or the sheet can be wetted to make it more flexible and then formed by flexing in any direction. The formed sheet can be heat-set in a desired shape by heating at 200° C. to 650° C.

18 Claims, No Drawings

SHAPING ANODIC ALUMINUM OXIDE SHEET

When an aluminium metal substrate is anodized in an electrolyte such as sulphuric acid or phosphoric acid, an anodic oxide film is formed on the surface. This film has a relatively thick porous layer comprising regularly spaced pores extending from the outer surface in towards the metal; and a relatively thin non-porous barrier layer adjacent the metal/oxide interface. As anodizing continues, metal is converted to oxide at the metal/oxide interface, and the pores extend further into the film, so that the thickness of the barrier layer remains constant. The cross-section and spacing of the pores and the thickness of the barrier layer are all proportional to the anodizing voltage.

It is possible to spare the anodic oxide film from the metal substrate. If the barrier layer is also removed, there remains a porous anodic aluminium oxide sheet. Such sheets are useful as filters for example for desalination of salt water, dewatering of whey, or for dialysis. Other uses include bacterial filters for cold sterilization, and gas cleaning.

EPA No. 178831 describes a method of making a porous anodic aluminium oxide sheet by the steps of anodizing an aluminium metal substrate; slowly reducing the applied voltage under controlled conditions to a level generally below 3V; carefully lifting the anodic oxide sheet from the metal substrate; and drying the sheet. Depending on thickness, the resulting sheet has quite good tensile strength but rather poor bending strength, and is fairly fragile and brittle.

For high performance, filter devices need to have a high filter area per unit volume. This is not easy to achieve with flat sheets of filter material. So it is usual to fold, pleat or roll filter sheets into spirals, in order to increase the surface area per unit volume. But conventional techniques cannot be applied to anodic aluminium oxide sheets on account of their fragility.

This invention arises in part from the discovery that if such a sheet is thoroughly wetted it becomes much more flexible than when dry. This discovery was unexpected. The invention thus provides in one aspect a method of forming into a desired shape an anodic aluminium oxide sheet, which method comprises wetting the sheet, forming the wetted sheet into the desired shape, and drying the sheet in that shape.

The invention further arises in part from the discovery that the sheet is better able to tolerate (without cracking) flexing in one direction than in another. This discovery applies to both wet and dry sheets, although wet sheets are more able to tolerate flexing in any given direction than the dry ones. As noted above, the aluminium oxide sheet is made by anodizing an aluminium metal substrate, which substrate will itself have been formed by elongation, e.g. by rolling, in a particular direction. It turns out that the anodic aluminium oxide sheet, after seperation form this substrate, is more tolerant to (without cracking) flexing in a direction transverse, e.g. at right angles, to the elongation direction. The invention provides in another aspect a method of forming into a desired shape an aluminium oxide sheet, said sheet having been made by anodizing an aluminium metal substrate which had previously been elongated in a particular direction which method comprises flexing the sheet in a direction, transverse to the particular direction so as to form the sheet without cracking into the desired shape. This aspect of the invention applies to both wet and dry sheets. The transverse direction is preferably at least 30° C. to the elongation direction.

Although other methods are described in the literature, the starting sheet is preferably made by the method of EPA No. 178831. The sheet is generally wetted with water since other liquids may be a fire hazard, and at ambient temperature.

The sheet is preferably formed into the desired shape by rolling. In this context, rolling means curling the membrane e.g. into a tubular or spiral shape. To avoid bending or fracturing the sheet during this operation, a cylindrical former is preferably used. To ensure adhesion of the sheet to the former, an adhesive may be applied to the surface of the former. Alternatively, if the former is hollow and perforated, the anodic oxide sheet may be held in place by reducing the pressure within the former. After the rolling operation has been completed, the sheet may be temporarily held in position on the former by means of clips or clamps.

Alternatively the sheet may be deformed to a desired shape by the application of a pressure differential across the sheet, e.g. by applying a vacuum to one side of the sheet or by press forming.

The sheet is preferably from 10 to 80 microns, particularly from 15 to 70 microns thick. Thick sheets tend to be rather inflexible even when wetted.

A single thickness of sheet may be rolled round a former. More usually, several thicknesses of sheet are wound in the form of a sprial, with a spacer between adjacent layers of anodic oxide sheet. For this purpose, a wetted sheet may be laid on a flat surface, a spacer sheet laid on top of it, and the two rolled together round the former. Alternatively, a stack of several sheets, alternately anodic oxide sheets and spacer sheets, may be laid on the flat surface and rolled up together. When the anodic oxide sheet is so thin as to be fragile on its own, it may be used on a porous support, in which case a stack of alternating (support plus anodic oxide) sheets and spacer sheets may be built up.

The deformations described are generally elastic, that is to say, when the deforming stress is removed the sheet returns to substantially its original shape. This is true even if the sheet is deformed when wet and then dried at low temperature in the deformed state. Various techniques may be used to hold the formed sheet in its desired shape, including clips supports, adhesives and heat staking. When the desired shape includes overlapping portions of sheet, the formed sheet can be held in shape by means of an adhesive applied between the overlapping portions. The sheet may advantageously be formed in the presence of a solution of phosphoric acid, which may confer benefit in particular by acting as an adhesive on drying.

This invention is further based on the discovery that the formed sheet can be heated under conditions to heat-set it in the desired shape. If the formed sheet, in the wet or dry state, is heated, perferably at from 200° C. to 650° C. for from 5 to 500 minutes, it is found to retain its shape without the need for clips, supports or adhesive. Longer times and/or higher temperatures could be used.

The shaped sheet can be used in position on a former which provides mechanical strength in use. Alternatively, the former can be removed, but some other support is then generally required to avoid risk of fracture.

A filtration device already exists which incorporates rolled membrane, but the membranes used are organic and polymeric and are may not be naturally brittle. The existing device is known as a spiral wound membrane module; membranes are placed as a sandwich in a porous support and then wound in a spiral configuration. A relatively high surface area can be installed per unit volume and costs are relatively low. The use of anodic aluminium oxide sheets to replace organic polymeric membranes in this application may be advantageous because anodic oxide sheets have high porosity and a narrow pore size distributor giving high flow rates and sharp cut-off.

EXAMPLE 1

In order to perform this operation, an anodic aluminium oxide sheet (60 mm × 100 mm and 30 microns thick) was placed in a shallow tray of deionised water until it was completely wet. It was then removed carefully and placed on a clean flat surface, viz. a glass plate, taking care not to fold or break the sheet in the process. One edge of the membrane sheet was carefully lifted and subjected to a very gentle rolling movement. Extremely slight pressure was applied to the sheet roll as it formed. When the complete sheet was formed into the tubular arrangement, the loose end was secured in its final position. The sheet in its tubular form was then placed carefully in an oven at 40° C. and left until completely dry. The clips securing the roll were then removed and the tube retained its shape. It is possible then to fabricate a holder for this roll for use in filtration processes.

EXAMPLE 2

The experiment described in Example 1 was repeated with two sheets of anodic oxide 30 microns thick produced by anodising in phosphoric acid. Both sheets were rinsed thoroughly with de-ionised water. The first sheet was wetted with de-ionised water before being formed into a tube. The second sheet was wetted with dilute phosphoric acid before being formed into a tube. Both tubes were held in shape by a constraint and dried at 40° C. for 17 hours.

On removing the constraints the well rinsed membrane was observed to recover its original flat shape. The second sheet, which had been wetted with dilute phosphoric acid, retained its tubular shape.

It is believed that the phosphoric acid makes the membrane surface slightly sticky and on drying the overlapping layers become glued together retaining the tubular shape.

EXAMPLE 3

Well rinsed 30 micron thick asymmetric membranes approx. 10 cm × 4 cm, produced by anodising in mixed acid, were soaked in de-ionised water for 15 minutes at 20° C. and then rolled to make a cylindrical shape with the edges of the membrane overlapping. The rolled membranes were retained in a beaker and heated in an oven to temperatures between 100° and 650° C. for times between 60 and 480 minutes. On cooling to room temperature the membranes were removed from the beaker and the resulting shape observed. At temperature below 200° C. there was no retention of the cylindrical shape; the membranes simply returned to their original flat sheet. Heating for several hours at 200° C. resulted in some retention of shape and good shape retention was obtained by heating for 1 hour at 400° or 650° C. (see Table 1).

TABLE 1

| Former Radius (mm) | Drying Temp (°C.) | Drying Time (min) | Shape Retention |
| --- | --- | --- | --- |
| 15 | 100 | 60 | None |
| 15 | 100 | 240 | None |
| 15 | 100 | 480 | None |
| 15 | 200 | 60 | None |
| 15 | 200 | 240 | Poor |
| 15 | 400 | 60 | Good |
| 15 | 650 | 60 | Good |
| 15 | 650 | 60 | Good* |

The cylinders heated to 400° or 650° C. retained their shape after exposure to cold or to hot (60° C.) deionised water for several hours indicating that a permanent change in shape was brought about by these heat treatments.

EXAMPLE 4

Dry, well rinsed 30 and 60 micron thick symmetric and asymmetric membranes approx. 26 cm × 12 cm produced by anodising in phosphoric acid were rolled round a 24 mm diameter form. The membranes were formed successfully when the long axis of the cylinder was at 90° or 45° or 30° the rolling direction of the sheet aluminium on which the anodic oxide was grown. Cracking occurred when the cylinders were formed with their long axis parallel to the rolling direction of the aluminium sheet.

A cylinder formed by rolling the dry film was secured and heated to 650° C. for 1 hour. On cooling and releasing the constraints holding the cylinder the shape was retained.

EXAMPLE 5

This example illustrates vacuum forming of the anodic membrane to make a corrugated sheet.

The die used for forming was made from a flat aluminium plate into which two sets of grooves were cut. In one set of grooves the ridges were 10 mm apart and the valleys 4 mm deep. The other set was finer having ridges 5 mm apart and only 2 mm deep. The grooves were generally of sine wave form and the tops of the ridges of both sets were in the same plane.

Forming was carried out by laying an anodic membrane 10 cm × 7 cm across both sets of grooves. A flexible plastic vacuum bag was placed around the assembly and the air evacuated slowly over a period of about 1 hour by means of a rotary vacuum pump. As the air was removed the vacuum bag collapsed down onto the membrane pushing it down into the die.

Membranes were tested either dry or after soaking in deionised water for 15 minutes at 20° C. 30 micron thick asymmetric membranes produced by anodising in phosphoric acid or 60 micron asymmetric membranes produced by anodising in mixed acids were used.

In all of the tests, the wet membrane took up the shape conforming to the profile of the coarse and the fine grooves without cracking. The dry membranes cracked along the ridges or bottoms of the valleys.

When the vacuum was released the unbroken membrane recovered its original shape.

EXAMPLE 6

This example illustrates press forming of the anodic membrane.

An anodic membrane 10 cm×7 cm was laid flat on a bed of fine zirconia powder. The die used in Example 5 was placed on the membrane and pressed down with a 4 kg weight while the assembly was heated to 400° C. for 1 hour.

Wet or dry membranes similar to those used in Example 5 were pressed formed. In all cases the membranes retained a slight imprint of the die on cooling but due to the small deformation imposed under these conditions it was not possible to make an exact replica of the die.

We claim:

1. A method of forming into a desired shape an anodic aluminium oxide sheet, which method comprises wetting the sheet, forming the wetted sheet into the desired shape, and drying the sheet in that shape.

2. A method of forming into a desired shape an aluminium oxide sheet, said sheet having been formed by anodizing an aluminium metal substrate which had previously been elongaged in a particular direction, which method comprises flexing the sheet in a direction transverse to the particular direction so as to form the sheet without cracking into the desired shape.

3. A method as claimed in claim 1, wherein the sheet is from 15 to 70 microns thick.

4. A method as claimed in claim 1, wherein the sheet is formed into the desired shape by rolling.

5. A method as claimed in claim 4, wherein several thicknesses of sheet are wound in the form of a spiral, with a spacer between adjacent layers of anodic oxide sheet.

6. A method as claimed in claim 1, wherein the sheet is press-formed into the desired shape.

7. Amethod as claimed in claim 1, wherein the sheet is formed in the presence of a solution of phosphoric acid.

8. A method as claimed in claim 1, wherein the formed sheet is held in the desired shape by the attachement to a support or to an adjacent portion of the sheet.

9. A method as claimed claim 1, wherein the formed sheet is heated under conditions to heat-set it in the desired shape.

10. A method as claimed in claim 9, wherein the heating conditions are a temperature of 200° to 650° C. for a time of 5 to 500 minutes.

11. A method as claimed in claim 2, wherein the sheet is from 15 to 70 microns thick.

12. A method as claimed in 2, wherein the sheet is formed into the desired shape by rolling.

13. A method as claimed in claim 12, wherein several thicknesses of sheet are wound in the form of a spiral, with a spacer between adjacent layers of anodic oxide sheet.

14. A method as claimed in claim 2, wherein the sheet is press-formed into the desired shape.

15. A method as claimed in claim 2, wherein the sheet is formed in the presence of a solution of phosphoric acid.

16. A method as claimed in claim 2, wherein the formed sheet is held in the desired shape by attachment to a support or to an adjacent portion of the sheet.

17. A method as claimed claim 2, wherein the formed sheet is heated under conditions to heat-set it in the desired shape.

18. A method as claimed in claim 17, wherein the heating conditions are a temperature of 200° to 650° C. for a time of 5 to 500 minutes.